UNITED STATES PATENT OFFICE.

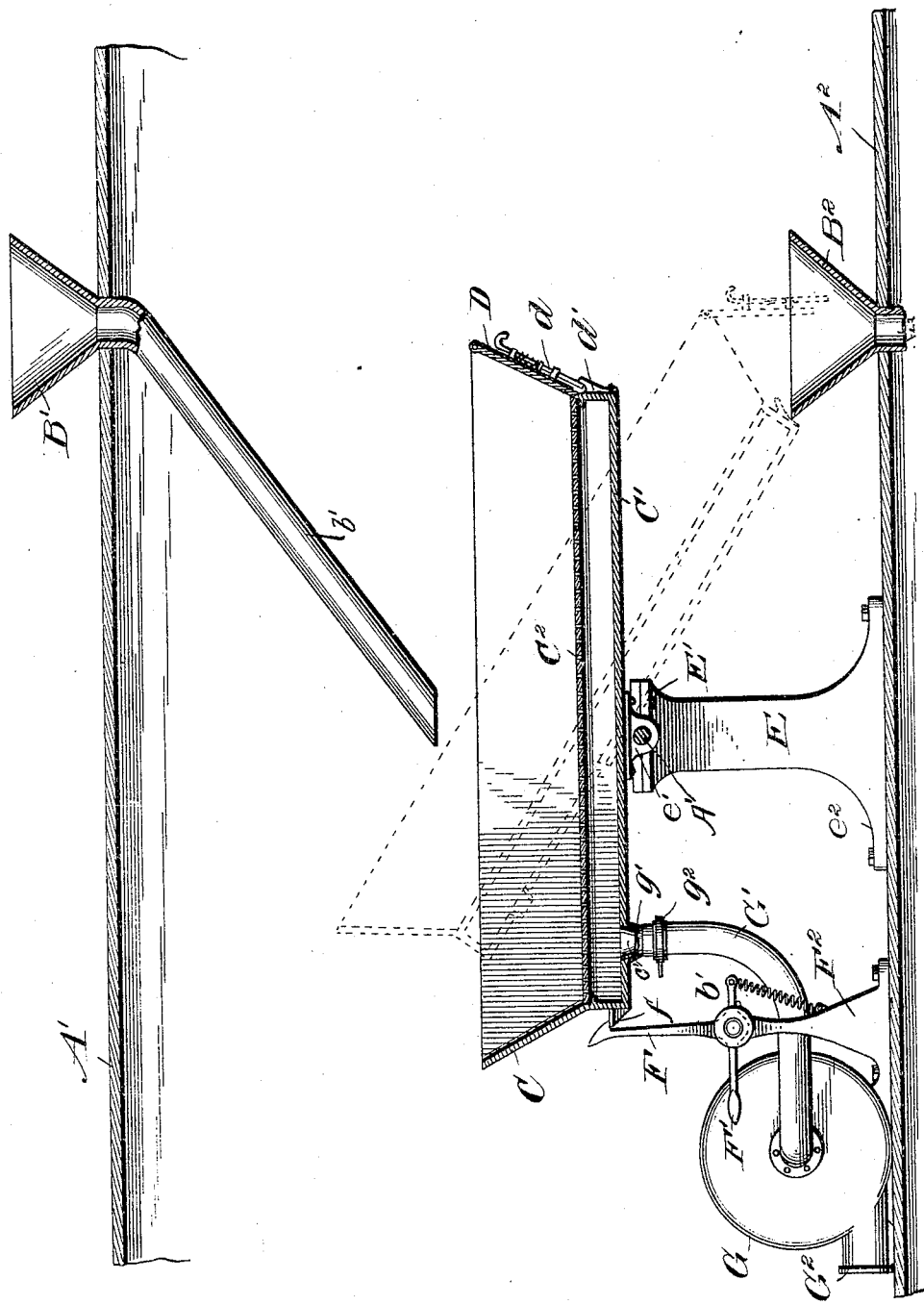

FREDERICK A. WEGNER AND JESSE D. BOURDEAU, OF DETROIT, MICHIGAN, ASSIGNORS TO CEREAL MACHINERY AND PRODUCTION COMPANY, LIMITED, OF WINDSOR, CANADA, A CORPORATION OF CANADA.

COOLING AND DRYING APPARATUS.

No. 807,408. Specification of Letters Patent. Patented Dec. 12, 1905.

Application filed April 15, 1903. Serial No. 152,745.

*To all whom it may concern:*

Be it known that we, FREDERICK A. WEGNER and JESSE D. BOURDEAU, citizens of the United States, residing at Detroit, county of Wayne, State of Michigan, have invented a certain new and useful Improvement in Cooling and Drying Apparatus; and we declare the following to be a full, clear, and exact description of the invention, such as will enable others skilled in the art to which it pertains to make and use the same, reference being had to the accompanying drawing, which forms a part of this specification.

Our invention relates in general to cooling and drying apparatus, and more particularly to such apparatus especially designed for use in the preparation of flake and granulated cereal food.

In manufacturing flake and granulated food the cereal is subjected to a treatment comprising a series of steps by means of which the raw grain is converted into the prepared food. The grain after being soaked is cooked in a steamer and then cooled and dried before being rolled.

The primary object of our invention is to provide an apparatus for removing the moisture from and cooling the cereal in the manufacture of flake food after it has been cooked in the steamer preparatory to its being rolled.

A further object of our invention is to provide a cooling and drying apparatus for cereals in the process of manufacturing flake and granulated food which receives the cereal from the steamer and after cooling and drying it passes it on to the rollers or other apparatus for performing the next step in the process of treatment.

A still further object of our invention is to provide an apparatus of the character referred to which will be simple in construction, inexpensive in manufacture, and efficient in use.

The present embodiment of our invention, generally described, consists in a tilting receptacle normally held in a horizontal position to receive the cereal as it is delivered from a chute leading from the steamer, a perforated plate upon which the cereal falls from the chute supported above the bottom of the receptacle, an exhausting device communicating with the bottom of the receptacle below the perforated plate to remove the moisture and cool the cereal, and means for transferring the cereal from the receptacle to a chute leading to the apparatus for performing the next step in the process of treatment.

Our invention will be more fully described hereinafter with reference to the accompanying drawing, in which the same is illustrated in a convenient and practical form, and in which the figure shows the invention in vertical section.

Reference characters $A'$ and $A^2$ designate platforms—such, for instance, as the floors in a factory for manufacturing cereal foods. Supported above the upper floor $A'$ is a hopper $B'$, into which the cereal is delivered after it has been cooked in a steamer. A chute $b'$ depends from the floor $A'$ and communicates at its upper end with the bottom of the hopper. A receptacle C, preferably having outwardly-inclined walls, is pivotally supported above the floor $A^2$ by any suitable means—such, for instance, as one or more standards E, provided with feet $e^2$, secured to the floor $A^2$. A shaft $A'$ may be secured beneath the bottom $C'$ of the receptacle C by means of brackets $e$, the shaft being mounted in bearings at the upper end of the standard or standards E. A perforated plate $C^2$ is supported within the receptacle C a short distance above the bottom $C'$ thereof. A beveled coupling $c'$ extends through and projects downwardly from the bottom $C'$ of the receptacle. A stationary flaring coupling $g'$ surrounds the coupling $c'$, and thereby places the interior of the receptacle below the perforated plate in communicating with a conduit $G'$, leading to a rotary fan or blower G or other exhausting device.

$G^2$ indicates a delivery-conduit leading from the fan.

A valve $g^2$, of any desired construction, may be located, if desired, in the conduit $G'$ at a point below and adjacent to the coupling $g'$.

The receptacle C is provided with a swinging door D, which extends from the upper edge of one of the sides thereof to a point in substantially the same horizontal plane as the perforated plate $C^2$. A latch $d$, of any desired construction, engages a keeper $d'$ to retain the door closed and to permit the same to swing open when desired. The latch $d$ is shown as secured to the exterior of the door and adapted to engage by means of a spring with the keeper $d'$, secured to the receptacle near the bottom thereof.

The pivotal support of the receptacle C is preferably located slightly to one side of the center thereof, so that the receptacle will have a tendency to tilt into the position shown in dotted lines. Means of any desired form are provided for retaining the receptacle normally in a horizontal position, such means being shown as comprising a latch F, pivotally supported upon a standard $F^2$, mounted upon the floor $A^2$. A lug or keeper $f$ projects from the receptacle, near the bottom thereof, and is engaged by the latch F to retain the receptacle in a horizontal position. A spring $f'$ swings the latch into engagement with its keeper, while a handle $F'$ is provided to disengage the latch F from the keeper $f$ when it is desired to permit the receptacle to swing into the position shown in dotted lines.

A hopper $B^2$ is supported above the floor $A^2$ in position to receive the material from the receptacle when the latter is swung downwardly. A chute $b^2$ depends from and communicates with the hopper $B^2$ for transmitting the cereal to the apparatus for performing the next step in its process in treatment.

The operation of our invention will be readily understood from the foregoing description and is as follows: The cereal is delivered into the hopper $B'$ and thence passes through the chute $b'$ into the receptacle C, where it is supported above the perforated plate $C^2$. The blower G produces a partial vacuum beneath the plate, thereby extracting the moisture from the cereal and cooling the same. When the cereal has been sufficiently dried and cooled, the handle $F'$ is pressed downwardly, which disengages the latch F from the keeper $f$ and permits the receptacle to swing downwardly, as shown in dotted lines. The latch $d$ is then disengaged from its keeper $d'$, which permits the door D to swing downwardly, so that the cereal slides from above the perforated plate $C^2$ into the hopper $B^2$ and thence passes into the chute $b^2$. After the cereal has passed out of the receptacle it is again swung into its horizontal position and there retained by the spring-actuated latch F engaging the keeper $f$. The inclined couplings $c'$ and $g'$ insure a tight joint, so as to effect an airtight communication between the conduit G and the interior of the receptacle below the perforated plate. The valve $g^2$ may be closed to cut off the blower from the coupling $g'$ prior to the swinging of the receptacle into position to remove the cereal therefrom.

From the foregoing description it will be observed that we have invented an apparatus for thoroughly and easily drying and cooling material which is particularly serviceable in making granular and flake foods, in removing the moisture, and in cooling cereal which has been cooked in a steamer and which is subsequently to be rolled.

While we have described more or less precisely the details of construction, we do not wish to be understood as limiting ourselves thereto, as we contemplate changes in form, the proportion of parts, and the substitution of equivalents as circumstances may suggest or render expedient without departing from the spirit of our invention.

Having now fully described our invention, what we claim as new, and desire to secure by Letters Patent, is—

1. In a drying and cooling apparatus, the combination with a tilting receptacle, of means for normally maintaining said receptacle in a horizontal position, a perforated plate supported within said receptacle above the bottom thereof upon which the material is received, a coupling communicating with and projecting downwardly from the bottom of the receptacle, a conduit terminating in a fixed coupling adapted to be engaged by the coupling on said receptacle, and exhausting mechanism communicating with said conduit.

2. In a drying and cooling apparatus, the combination with a tilting receptacle, of means for normally maintaining said receptacle in a horizontal position, a perforated plate supported within said receptacle above the bottom thereof upon which the material is received, an exhausting apparatus, means for detachably connecting said exhausting apparatus with said receptacle below the perforated plate therein, and a door through said receptacle above said perforated plate therein, whereby when the receptacle is swung downwardly it is disconnected from the exhausting device and the material is discharged therefrom through said door.

3. In a drying and cooling apparatus, the combination with a tilting receptacle having outwardly-inclined side walls, of means for normally maintaining said receptacle in a horizontal position, a perforated plate supported within said receptacle above the bottom thereof upon which the material is received, an outwardly-swinging door closing an opening in a side wall in said receptacle above said plate, a coupling communicating with and projecting downwardly from the bottom of said receptacle, a conduit terminating in a fixed coupling adapted to be engaged by the coupling on the receptacle when the latter is in a horizontal position, an exhausting device communicating with said conduit, and an outwardly-swinging door closing an opening in the side wall of said receptacle above said plate, whereby when the receptacle is swung downwardly it is disconnected from the exhausting device and the material discharged through said door, the latter swinging open by gravity.

4. In a drying and cooling apparatus for cereals in manufacturing flake and granular food, the combination with a tilting receptacle having outwardly-inclined side walls and a normally horizontal bottom wall, a perforated plate supported within said receptacle above the bottom wall thereof, an inwardly-tapering coupling projecting below and communicating with said receptacle, an outwardly-flaring fixed coupling adapted to receive said tapered coupling when the receptacle is in a horizontal position, a conduit connected with said fixed coupling, a blower communicating with said conduit, an outwardly-swinging door closing an opening in the side wall of said receptacle, and a hopper located beneath said receptacle and adapted to receive the material therefrom as it passes through said door.

In testimony whereof we sign this specification in the presence of two witnesses.

FREDERICK A. WEGNER.
JESSE D. BOURDEAU.

Witnesses:
GEO. L. WILKINSON,
CLARA C. CUNNINGHAM.